United States Patent [19]
Windholz et al.

[11] 3,714,208
[45] Jan. 30, 1973

[54] 13-AMINOGONANES AND N-ACYL AND N-ALKYL DERIVATIVES THEREOF

[75] Inventors: Thomas B. Windholz, Westfield; David B. R. Johnston, Warren; Arthur A. Patchett, Cranford, all of N.J.

[73] Assignee: Merck & Co., Inc., Rahway, N.J.

[22] Filed: April 7, 1971

[21] Appl. No.: 132,242

Related U.S. Application Data

[63] Continuation-in-part of Ser. No. 771,327, Oct. 28, 1968, abandoned.

[52] U.S. Cl. ......260/397.4, 260/397.45, 260/397.5, 260/999
[51] Int. Cl. ............................................C07c 169/10
[58] Field of Search ......./Machine Searched Steroids

[56] References Cited

UNITED STATES PATENTS 2,989,526   6/1961   Kerwin et al. ...................260/239.57

*Primary Examiner*—Henry A. French
*Attorney*—Louis Wolk, J. Jerome Behan and Hesna J. Pfeiffer

[57] ABSTRACT

13-Amino steroids and 13-substituted amino steroids of the gonane series prepared by total synthesis starting from initial condensation of a 2-acyl-aminocyclopentane-1,3-dione and the isothiuronium salt derived from 6-alkoxy-1-vinyl-1,2,3,4-tetrahydro-1-naphthol. The condensation product is then cyclicized and hydrogenated to obtain, successively, 8,14-bis-dehydro-13-acylamino-18-norestrone alkyl ether and 8-dehydro-13-acylamino-18-norestrone alkyl ether and finally, by reduction, the 8-dehydro-13-acylamino-18-norestradiol analog. The latter compound is further reduced to obtain 13-acylamino-18-norestrone alkyl ether and then 13-amino-18-norestradiol alkyl ether after hydrolysis. The 13-acylamino compound is then, by Birch reduction and deacetylation, converted to 13-amino-18,19-bisnortestosterone. The 13-amino group is alkylated to obtain a 13-alkylamino-18,19-bisnortestosterone. The compounds exhibit anti-androgenic activity and are useful for control of fertility and for control of the menstrual cycle.

17 Claims, No Drawings

13-AMINOGONANES AND N-ACYL AND N-ALKYL DERIVATIVES THEREOF

RELATIONSHIP TO OTHER CASES

This application is a continuation-in-part application of U.S. Ser. No. 771,327 filed Oct. 28, 1968, now abandoned.

The novel compounds of this invention are represented by the following structural formulas:

wherein $R_1$ represents an alkyl group; $R_4$ and $R_5$ represent hydrogen or an alkyl group; X represents an alkanoylamino group; and Z represents an amino group or an alkanoylamino group. The dotted line at the 14-position indicates the optional presence of a double bond.

Although the symbol $R_1$ represents an alkyl group, such symbol preferably represents a lower alkyl group having from 1 to about 5 carbon atoms, i.e., methyl, ethyl, propyl, butyl, amyl, and the like.

The symbols $R_4$ and $R_5$ represent hydrogen or an alkyl group, preferably hydrogen or a lower alkyl group of one to five carbon atoms, i.e., methyl, ethyl, propyl, butyl, amyl, and the like. When both $R_4$ and $R_5$ are alkyl, they are the same alkyl group.

The substituent represented by X is lower alkanoylamino and the substituents represented by Z are an amino group or an alkanoylamino group, preferably amino or a lower alkanoylamino group having from two to about five carbon atoms in the alkanoyl moiety, e.g., acetylamino, propionylamino, butyrylamino, valerylamino and the like.

The 13-aminogonanes encompassed by the above formulas have anti-androgenic activity and are of utility in the control of fertility and in the control of the menstrual cycle.

The 13-aminogonanes and the N-alkyl, N,N-dialkyl and N-acylamino derivatives thereof are prepared as illustrated below:

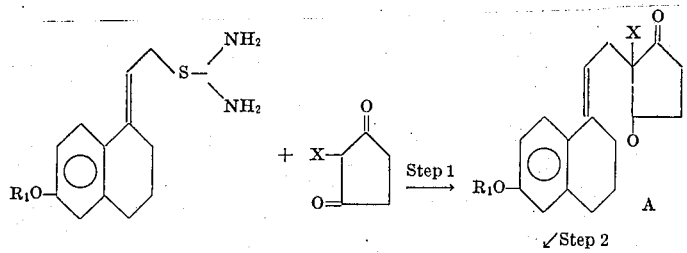

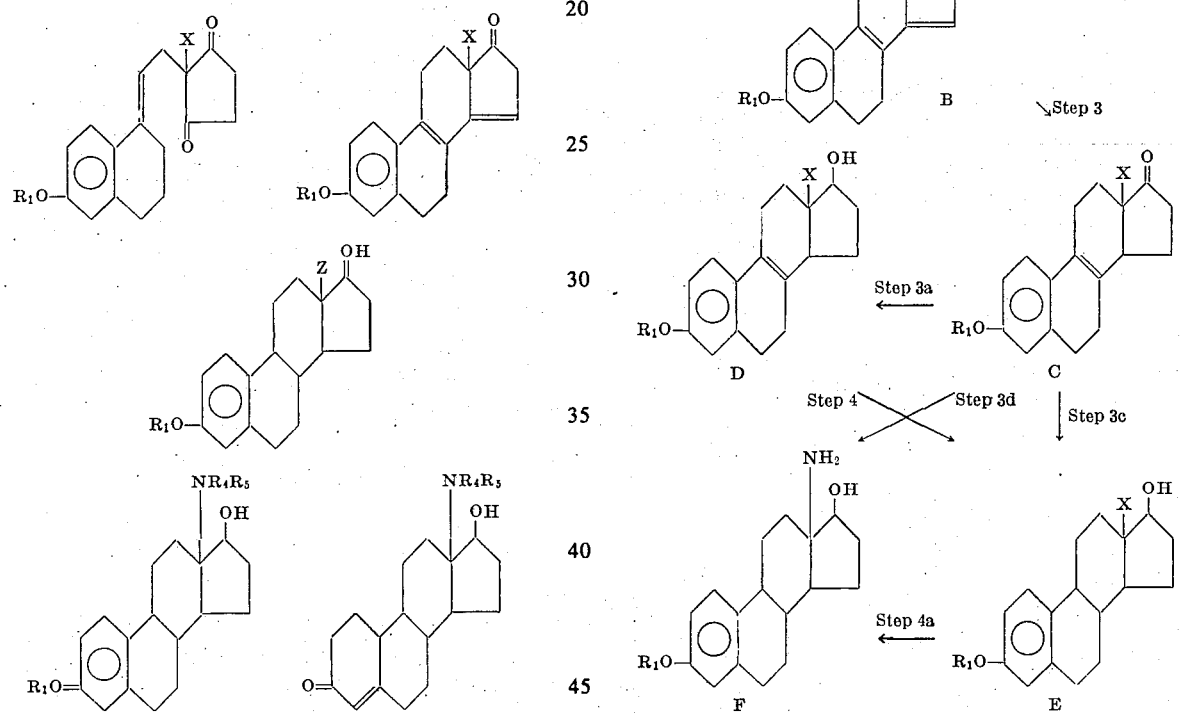

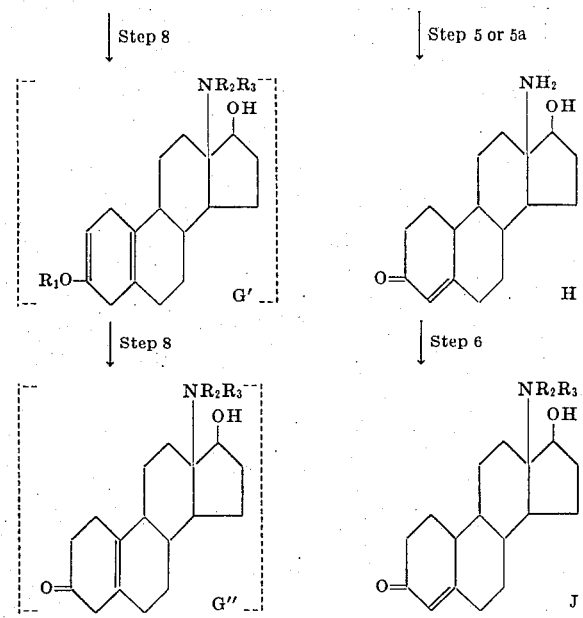

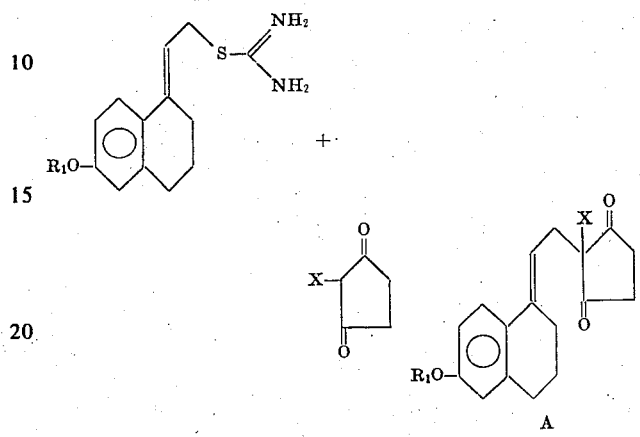

Step 1 illustrates the condensation, for example, of the S-alkylisothiuronium salt of 6-lower alkoxy-1-vinyl-1,2,3,4-tetrahydronaphthalene-1-ol and a 2-acylaminocyclopentane-1,3-dione to obtain 2-[3,4-dihydro-6-lower alkoxy-1-(2H-naphthylidene)ethyl]-2-acylaminocyclopentane-1,3-dione (Compound A, where X=acylamino). Thus, The substituents $R_2$ and $R_3$ are the same as $R_1$.

In accordance with the reaction scheme illustrated above, a 2-alkanoylamino-cyclopentane-1,3-dione is condensed with the S-alkylisothiuronium salt of 6-lower alkoxy-1-vinyl-1,2,3,4-tetrahydronaphthalene-1-ol to obtain the 2-[2-(3,4-dihydro-6-alkoxy-1-(2H)-naphthyl-idene) ethyl]-2-alkanoylamino-cyclopentane-1,3-dione (A). The latter compound is then cyclicized in acetic acid with p-toluenesulfonic acid to obtain 8,14-bisdehydro-13-alkanoylamino-18-norestrone-3-alkyl ether (B) which is then hydrogenated to the 8-dehydro-13-alkanoylamino-18-norestrone-3-alkyl ether (C). The 8-dehydro-13-alkanoyl-amino-18-norestrone-3-alkyl ether is reduced to the corresponding 8-dehydro-13-alkanoylamino-18-norestradiol-3-alkyl ether (D), which is then further reduced to the corresponding 13-alkanoylamino-18-norestradiol-3-alkyl ether (E), which can be hydrolyzed to 13-amino-18-norestradiol-3-alkyl ether (F). The 13-amino-18-norestradiol-3-alkyl ether (F) is then converted to the mono- or di-alkyl derivative (G) by standard methods. By further Birch reduction, oxalic acid treatment and hydrolysis, 13-$NR_2R_3$-18,19-bisnortestosterone (J) is obtained.

Alternatively, the 8-dehydro-13-alkanoylamino-18-norestrone alkyl ether (C), by Birch reduction and hydrolysis is converted directly into 13-amino-18-norestradiol-3-alkyl ether (F) without the necessity of the route via compounds (D) and (E).

Another route to 13-$NR_2R_3$-18,19-bisnortestosterone (J) is by Birch reduction of 13-amino-18-norestradiol-3-alkyl ether (F) and subsequent oxalic acid treatment and acid rearrangement to obtain 13-amino-18,19-bisnortestosterone (H) which is then easily alkylated to the 13-monoalkyl- or 13-dialkyl-amino-18,19-bisnortestosterone (J).

The 13-$NR_2R_3$-18,19-bisnortestosterone compounds of the invention are also obtained from 8-dehydro-13-X-18-norestrone alkyl ethers (C) by Birch reduction to obtain 13-X-18-norestradiol-3-alkyl ether (E), hydrolysis to (F), and then a further Birch reduction and then proceeding, as described above, by oxalic acid treatment double bond rearrangement and alkylation.

Following is a more detailed and specific description of the various syntheses described above and illustrated in the general reaction scheme.

The condensation is conducted in a reaction-inert organic solvent such as t-butanol or t-butanol/xylene. Alternatively, other inert solvents such as dioxane or tetrahydrofuran may be used. The reaction is conveniently carried out at a temperature of from about 20°C. to about 120°C. during a reaction period of from about 1 to about 24 hours. Naturally, the optimum reaction period will depend on the selected temperature, but from the point of view of obtaining optimum yields within practical reaction periods, it is preferred to carry out the condensation during a period of from about 2 to about 4 hours at a temperature of from about 80° to about 100°C. Preferably, reflux conditions and an inert atmosphere are desirable.

Illustrative 2-acylaminocyclopentane-1,3-diones which are utilized in the condensation include 2-acetylaminocyclopentane-1,3-dione, 2-propionyl-aminocyclopentane-1,3-dione, 2-butyrylamino-cyclopentane-1,3-dione, 2-valerylaminocyclopentane-1,3-dione and the like.

Step 2 involves the cyclicization of the C-ring of 2-[2-(3,4-dihydro-6-lower alkoxy-1(2H)-naphthylidene(ethyl]-2-alkanoylamino-cyclopentane-1,3-dione (Compound A) to obtain 8,14-bisdehydro-13-alkanoylamino-18-norestrone-3-lower alkyl ether (Compound B). Thus,

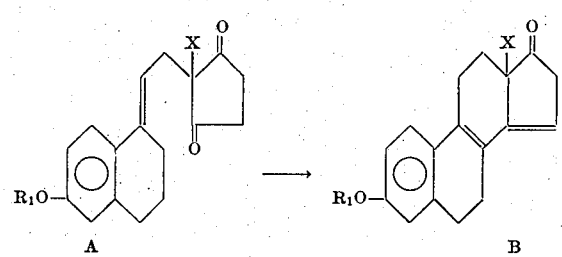

The cyclicization is accomplished by treating Compound A with an acid, such as by maintaining (1) a solution of Compound A in an organic solvent, for example, toluene, xylene or the like containing anhydrous p-toluenesulfonic acid, (2) a solution of Compound A in methanolic HCl or (3) a solution of Compound A in acetic acid or other lower aliphatic carboxylic acid containing anhydrous p-toluene-sulfonic acid, at an elevated temperature for a few minutes, preferably at a temperature of about 60°C. for about 15 to 20 minutes. The cyclization will take place at ambient temperature and pressure. Compound B is isolated by filtering the precipitated material, washing sequentially with water/NaHCO₃/water and drying the crystals thus obtained.

Illustrative compounds which are prepared in this manner include 8,14-bisdehydro-13-acetylamino-18-norestrone-3-methyl ether, 8,14-bisdehydro-13-acetylamino-18-norestrone-3-n-butyl ether, 8,14-bisdehydro-13-propionylamino-18-norestrone-3-ethyl ether, 8,14-bisdehydro-13-propionylamino-18-norestrone-3-amyl ether, 8,14-bisdehydro-13-butyrylamino-18-norestrone-3-methyl ether, 8,14-bisdehydro-13-butyrylamino-18-norestrone-3-n-propyl ether, 8,14-bisdehydro-13-valerylamino-18-norestrone-3-ethyl ether, 8,14-bisdehydro-13-valerylamino-18-norestrone-13-isopropyl ether and the like.

Step 3 involves the catalytic hydrogenation of 8,14-bisdehydro-13-alkanoylamino-18-norestrone-3-lower alkyl ether (Compound B) to obtain 8-dehydro-13-alkanoylamino-18-norestrone-3-lower alkyl ether (Compound C). Thus,

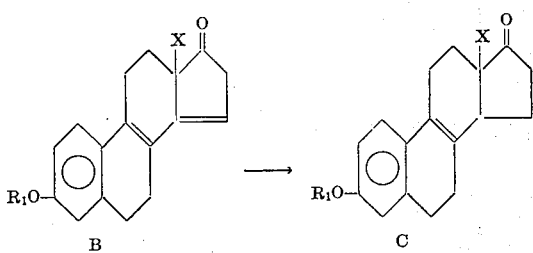

Catalytic hydrogenation is accomplished by shaking a solution of Compound B in solution in an inert organic solvent, such as dry dioxane, benzene, toluene, xylene, etc., containing a catalyst such as palladium on calcium carbonate or 2 percent palladised charcoal, with hydrogen until one molecular equivalent of hydrogen is absorbed.

Compound C is isolated by cooling the reaction mixture, adding ether, washing with dilute aqueous potassium bicarbonate solution and then with saturated aqueous NaCl solution, drying over magnesium sulfate and concentrating to dryness by distillation under reduced pressure. The residue is Compound C and it is purified by recrystallization from a suitable solvent.

Illustrative compounds, corresponding to Compound C, above, include 8-dehydro-13-acetylamino-18-norestrone-3-methyl ether, 8-dehydro-13-acetylamino-18-norestrone-3-n-butyl ether, 8-dehydro-13-propionylamino-18-norestrone-3-ethyl ether, 8-dehydro-13-propionylamino-18-norestrone-3-amyl ether, 8-dehydro-13-butyrylamino-18-norestrone-3-methyl ether, 8-dehydro-13-butyrylamino-18-norestrone-3-n-propyl ether, 8-dehydro-13-valerylamino-18-norestrone-3-ethyl ether, 8-dehydro-13-valerylamino-18-norestrone-3-isopropyl ether and the like.

Step 3a involves the reduction of Compound C to obtain 8-dehydro-13-X-18-norestradiol-3-lower alkyl ether (Compound D) by utilization of a hydride transfer reagent such as an alkali metal borohydride. Thus, Suitable alkali metal borohydrides are sodium borohydride or potassium borohydride. The reaction is carried out under reflux conditions in a suitable solvent, e.g., a lower alkanol such as ethanol, t-butanol and the like.

Illustrative compounds prepared in this manner include 8-dehydro-13-acetylamino-18-norestradiol-3-ethyl ether, 8-dehydro-13-acetylamino-18-norestradiol-3-propyl ether, 8-dehydro-13-propionylamino-18-norestradiol-3-methyl ether, 8-dehydro-13-propionylamino-18-norestradiol-3-butyl ether, 8-dehydro-13-butyrlamino-18-norestradiol-3-ethyl ether, 8-dehydro-13-butyryl-amino-18-norestradiol-3-amyl ether, 8-dehydro-13-valerylamino-18-norestradiol-3-methyl ether, 8-dehydro-13-valerylamino-18-norestradiol-3-ethyl ether and the like.

Step 4 involves the Birch reduction of Compound D to obtain 13-X-18-norestradiol-3-lower alkyl ether (Compound E). Thus, The reduction is carried out by partially dissolving the steroid in a small amount of tetrahydrofuran and adding the slurry to a solution of liquid ammonia and a proton doner such as aniline. An alkali metal, e.g., sodium or potassium, is then added and the solution is refluxed for a length of time sufficient to accomplish the reduction. Compound E is isolated by quenching the reaction with ammonium chloride, allowing the ammonia to evaporate, adding water, extracting and concentrating to dryness by distillation under reduced pressure.

Illustrative compounds, corresponding to Compound E, which are prepared in this manner include:

13-acetylamino-18-norestradiol-3-ethyl ether, 13-acetylamino-18-norestradiol-3-propyl ether, 13-propionylamino-18-norestradiol-3-methyl ether, 13-propionylamino-18-norestradiol-3-butyl ether, 13-butyrylamino-18-norestradiol-3-ethyl ether, 13-butyrylamino-18-norestradiol-3-amyl ether, 13-valerylamino-18-norestradiol-3-methyl ether, 13-valerylamino-18-norestradiol-3-ethyl ether and the like.

Step 4a involves the hydrolysis of Compound E to obtain 13-amino-18-norestradiol-3-lower alkyl ether (Compound F). Thus,

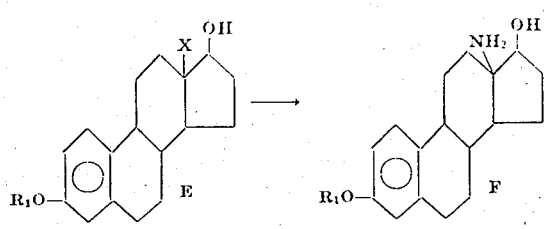

The hydrolysis is accomplished by partially dissolving the acylamino estradiol steroid in alcoholic KOH and bubbling nitrogen through the solution overnight. Compound F is isolated by diluting the solution with water, extracting with ethyl acetate, washing with water and concentrating to dryness by reduced pressure distillation.

Illustrative compounds, corresponding to Compound F, which are prepared in this manner include 13-amino-18-norestradiol-3-methyl ether, 13-amino-18-norestradiol-3-ethyl ether, 13-amino-18-norestradiol-3-n-propyl ether, 13-amino-18-norestradiol-3-i-propyl ether, 13-amino-18-norestradiol-13-n-butyl ether, 13-amino-18-norestradiol-n-amyl ether and the like.

Step 5 involves the Birch reduction of Compound F to obtain 3-alkoxy-13-amino-18-norestra-2,5(10)-diene-17-ol (Compound F′), the intermediate A-ring dihydrocompound, treatment of Compound F′ to obtain the unconjugated ketone intermediate (Compound F″) and acid treatment of Compound F″ to obtain 13-amino-18,19-bisnortestosterone (Compound H). Thus,

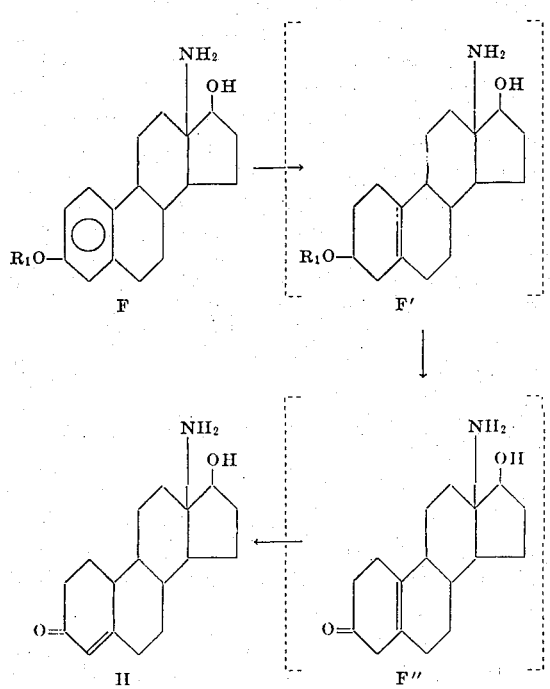

The reduction is carried out by dissolving Compound F in dry tetrahydrofuran or equivalent solvent and adding the solution to liquid ammonia. A small amount of a lower alkanol is added, followed by an alkali metal, e.g., sodium. The solution is then refluxed for a short time. Upon quenching the reaction and work-up, the intermediate steroid F′ is obtained and treated with a carboxylic acid, such as oxalic acid or malonic acid, to obtain the intermediate F″ which undergoes rearrangement upon treatment with alcoholic HCl to obtain Compound H.

Alternatively, the intermediate F′ is treated with hydrogen chloride or p-toluene sulfonic acid to directly obtain Compound H.

Step 6 involves the alkylation of Compound H to obtain 13-monoalkyl- or 13-dialkyl-amino-18,19-bisnortestosterone (Compound J). Thus,

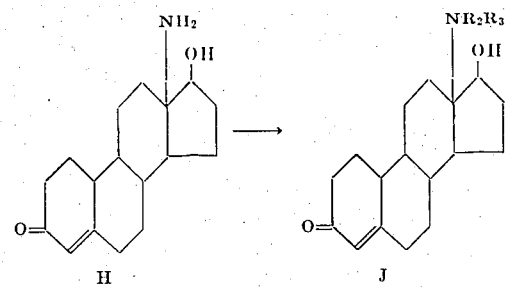

The alkylation is carried out using an appropriate alkyl halide in a suitable solvent under basic reaction conditions. By utilizing appropriate concentrations and conditions, either mono- or di-alkylation takes place.

Illustrative compounds corresponding to Compound J, prepared in this manner, include 13-N-methylamino-18,19-bisnortestosterone, 13-N-ethylamino-18,19-bisnortestosterone, 13-N-propylamino-18,19-bisnortestosterone, 13-N-butylamino-18,19-bisnortestosterone, 13-N-amylamino-18,19-bisnortestosterone, 13-N,N-dimethylamino-18,19-bisnortestosterone, 13-N,N-diethylamino-18,19-bisnortestosterone, 13-N,N-dipropylamino-18,19-bisnortestosterone, 13-N,N-dibutylamino-18,19-bisnortestosterone and the like.

As briefly described above, an alternate route to Compound J is from Compound F, as illustrated by steps 7 and 8.

Thus, Step 7 involves the alkylation of Compound F to obtain the 13-monoalkyl- or 13-dialkyl-amino derivative of 13-amino-18-norestradiol-3-lower alkyl ether (Compound G) as follows:

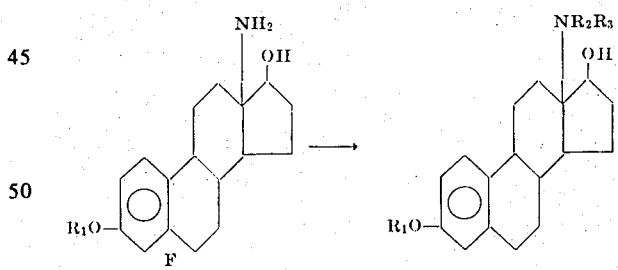

The alkylation is carried out by utilization of an appropriate alkyl halide, e.g., methyl bromide, ethyl iodide, n-propyl iodide, etc., in acetonitrile or similar appropriate solvent using sodium carbonate or the like in order to maintain basic reaction conditions.

Illustrative compounds prepared in this manner include 13-N-methylamino-18-norestradiol-3-methyl ether, 13-N-propylamino-18-norestradiol-3-ethyl ether, 13-N,N-dimethylamino-18-norestradiol-3-methyl ether, 13-N,N-diethylamino-18-norestradiol-3-methyl ether, 13-N,N-di-n-propylamino-18-norestradiol-3-n-propyl ether, 13-N,N-dibutylamino-18-norestradiol-3-amyl ether and the like.

Step 8 involves the Birch reduction of Compound G to obtain the intermediate A-ring dihydro Compound (G''), treatment of Compound G' to obtain the unconjugated ketone intermediate (G'') and acid treatment of Compound G'' to obtain the 13-monoalkyl- or 13-dialkyl-amino-18-bisnortestosterone (Compound J). Thus,

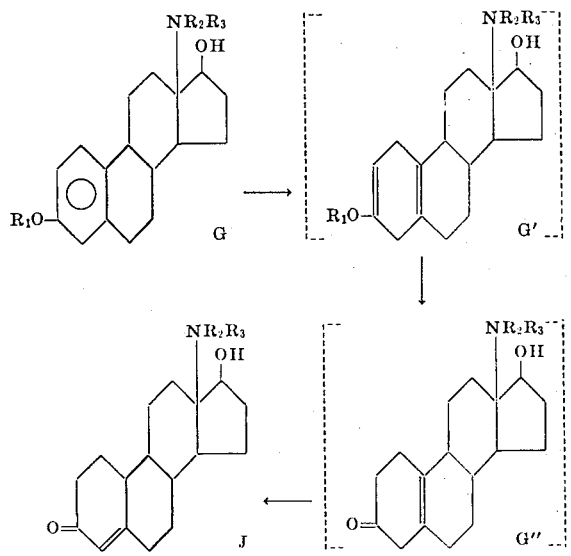

The Birch reduction is carried out by dissolving Compound G in dry tetrahydrofuran and adding the solution to liquid ammonia. A small amount of a lower alkanol is added, followed by an alkali metal, e.g., sodium. The solution is then refluxed for a short time. Upon quenching the reaction and standard work-up, the intermediate G' is obtained and treated with oxalic acid to obtain the intermediate G'' which is then treated with alcoholic HCl to obtain Compound J.

Alternatively, Compound J is obtained directly by rearrangement of intermediate G' upon treatment with hydrogen chloride or p-toluenesulfonic acid.

Although the preferred reaction routes are described above, alternative routes to certain of the compounds may be utilized.

Thus, Compound E is obtained directed from compound C by subjecting Compound C to Birch reduction as illustrated by Step 3c of the reaction scheme. Also, Compound F is obtained by Birch reduction and hydrolysis of Compound C (Step 3d).

Further, Compound H is obtained from Compound I by Birch reduction, oxalic acid treatment, and acid rearrangement as illustrated in Step 5a of the reaction scheme.

The following examples will further serve to illustrate the preparation of the novel compounds of this invention, but it is understood that the scope of the invention is not to be construed solely from the examples, but from the specification, examples, and claims.

EXAMPLE 1

Preparation of S-alkylisothiuronium salt of 6-methyl-1-vinyl-1,2,3,4-tetrahydronaphthalene-1-ol To a solution of 0.1 mole of 6-methyl-1-vinyl-1,2,3,4-tetrahydronaphthalene-1-ol in 300 ml. of acetic acid is added 0.1 mole of thiourea. After heating gently for one hour, the crystalline product is obtained in nearly quantitative yield, melting point 125°–127°C.

EXAMPLE 2

Preparation of 2-Phenylazocyclopentane-1,3-dione

A solution of 500 mg. freshly distilled aniline and 1.37 ml. concentrated hydrochloric acid in 1.37 ml. of water is cooled to 0°–5°, and 400 mg. of sodium nitrite in 1.87 ml. of water is added dropwise with vigorous stirring and cooling until starch iodide paper just indicates an excess of nitrous acid. This solution is added at 0° to a mixture of 613 mg. of cyclopentane-1,3-dione in 1.88 ml. 95 percent ethanol and 2.5 g. sodium acetate in 15 ml. of water. The reaction is allowed to warm to room temperature and after another half hour is filtered, the cake being washed several times with water and airdried overnight. Yield: 1.02 g., Recrystallization from methanol gives pure 2-phenylazocyclopentane-1,3-dione, melting point 180°–184°.
Anal. Calcd. for C, 65.33; H, 4.98; N, 13.86.
Found: C, 65.21; H, 4.97; N, 13.76.

Preparation of 2-Acetylaminocyclopentane-1,3-dione

A suspension of 3.0 g. of azodione in 35 ml. of glacial acetic acid is added in portions to 13.7 ml. of glacial acetic acid and 17.65 g. of acetic anhydride maintained at 15°–20° over a 1-hour period. During this period, 10.8 g. of zinc dust are also added in portions. The last traces of azodione are transferred with the help of 34 ml. glacial acetic acid and after all has been stirred for another hour, the mixture is filtered, and the cake washed with acetic acid. Evaporation of the filtrates under reduced pressure gives 4.7 g. material, 2.4 g. of which are dissolved in 20 ml. of chloroform. Repeated extractions of the chloroform with aqueous base and washing with water gives, after evaporation, 1.02 g. acetanilide. The combined aqueous solutions are acidified and extracted with chloroform, removing another 0.1 g. acetanilide. The aqueous solution is saturated with ammonium chloride and continuously extracted for 4–5 days with chloroform to give 0.88 g. 2-acetylaminocyclopentane-1,3-dione. Recrystallization from chloroform/ether affords the product, melting point 163°–164°.
Anal. Calcd. for C, 54.19, H, 5.85; N, 9.03.
Found: C,54.17; H, 5.77; N, 8.99.

EXAMPLE 3

Preparation of 2-[2-(3,4-dihydro-6-methoxy-1(2H)-naphthyli-dene)-ethyl]-2-acetylaminocyclopentane-1,3-dione A mixture of 27.3 grams of the S-alkylisothiuronium salt prepared and described in Example 1 and 12.55 g. of 2-acetylaminocyclopentane-1,3-dione prepared and described in Example 2 are combined in 590 ml. of t-butyl alcohol and the mixture is refluxed for 3 hours under nitrogen. The reaction mixture is then diluted with 1.75 liters of ethyl ether and washed twice with 500 ml. portions of 1N sodium hydroxide. The organic layer is washed with water, dried over magnesium sulfate and concentrated in vacuo. There is recovered 23.10 grams of 2-[2-(3,4-dihydro-6-methoxy-1(2H)-napthylidene)-ethyl]-2-acetylaminocyclopentane-1,3-dione, melting point 127°–132°C.

EXAMPLE 4

Preparation of 8,14-Bisdehydro-13-acetylamino-18-norestrone-3-methyl ether

An amount of 2.675 g. of 2-[2-(3,4-dihydro-6- methoxy-1-(2H)-naphthylidene)-ethyl]-2-acetylaminocyclopentane-1,3-dione and 2.675 g. of p-toluenesulfonic acid is dissolved in 267.5 ml. of glacial acetic acid. The mixture is stirred at room temperature under nitrogen and left overnight in the dark.

The precipitated material is filtered, washed with water, sodium bicarbonate, and again with water, and dissolved in ethyl acetate. The material is then dried to obtain white crystals of the tetracyclic ketone 8,14-bis-dehydro-13-acetylamino-18-noresterone-3-methyl ether, melting point 210°C.

EXAMPLE 5

Preparation of 8-dehydro-13-acetylamino-18-noresterone-3-methyl ether

An amount of 1.2 grams (0.00394 mole) of 8,14-bis-dehydro-13-acetylamino-18-norestrone-3-methyl ether is exposed to hydrogenation conditions in 200 ml. of dioxane, using 640 mg. of pre-reduced 25 percent palladium/calcium carbonate hydrogenation catalyst and 0.00394 mole of hydrogen. The hydrogenation is conducted at atmospheric pressure and room temperature.

There is obtained a yield of 1.354 grams of 8-dehydro-13-acetylamino-18-norestrone-3-methyl ether, melting point 234°-235°C.

EXAMPLE 6

Preparation of 8-dehydro-13-acetylamino-18-norestradiol-3-methyl ether

In 22 ml. of absolute ethanol, there is dissolved 2.00 g. of 8-dehydro-13-acetylamino-18-norestrone-3-methyl ether and 1.54 g. of sodium borohydride. The mixture is refluxed for 1.5 hours under nitrogen and poured into ice saturated with sodium phosphate solution. The ice mixture is extracted three times with ethyl acetate, washed twice with water, and again extracted with ethyl acetate. The organic phases are then combined, dried and concentrated.

There is obtained 1.452 g. of 8-dehydro-13-acetylamino-18-norestradiol-3-methyl ether in white crystalline form, melting point 203°-205°C.

EXAMPLE 7

Preparation of 13-acetylamino-18-norestradiol-3-methyl ether

An amount of 100 mg. of 8-dehydro-13-acetylamino-18-norestrone-3-methyl ether is partially dissolved in 1.6 ml. of dry tetrahydrofuran and the mixture is added as a slurry to 6.0 ml. of liquid ammonia containing 0.6 mg. of aniline. To the reaction mixture there is added 96 mg. of sodium and the resulting blue solution is refluxed for 20 minutes and then quenched with ammonium chloride. After evaporation of the ammonia, water is added to the reaction mixture and the mixture is extracted with ethyl acetate, back-washed, dried and concentrated. dehydro-13-acetylamino-18-norestrone-3-methyl ether, melting point 234°-235°C.

EXAMPLE 6

Preparation of 8-dehydro-13-acetylamino-18-norestradiol-3-methyl ether

In 22 ml. of absolute ethanol, there is dissolved 2.00 g. of 8-dehydro-13-acetylamino-18-norestrone-3-methyl ether and 1.54 g. of sodium borohydride. The mixture is refluxed for 1.5 hours under nitrogen and poured into ice saturated with sodium phosphate solution. The ice mixture is extracted three times with ethyl acetate, washed twice with water, and again extracted with ethyl acetate. The organic phases are then combined, dried and concentrated.

There is obtained 1.452 g. of 8-dehydro-13-acetylamino-18-norestradiol-3-methyl ether in white crystalline form, melting point 203°-205°C.

Substituting 8-dehydro-13-amino-18-norestrone-3-methyl ether in the above procedure affords 8-dehydro-13-amino-18-norestradiol-3-methyl ether.

EXAMPLE 7

Preparation of 13-acetylamino-18-norestradiol-3-methyl ether

An amount of 100 mg. of 8-dehydro-13-acetylamino-18-norestrone-3-methyl ether is partially dissolved in 1.6 ml. of dry tetrahydrofuran and the mixture is added as a slurry to 6.0 ml. of liquid ammonia containing 0.6 mg. of aniline. To the reaction mixture there is added 96 mg. of sodium and the resulting blue solution is refluxed for 20 minutes and then quenched with ammonium chloride. After evaporation of the ammonia, water is added to the reaction mixture and the mixture is extracted with ethyl acetate, back-washed, dried and concentrated.

There is obtained 115 mg. of 13-acetylamino-18-norestradiol-3-methyl ether in the form of reddish crystals, melting point 194°-195°C.

EXAMPLE 8

Preparation of 13-amino-18-norestradiol-3-methyl ether

One hundred milligrams of 13-acetylamino-18-norestradiol-3-methyl ether is partially dissolved in 6.65 ml. 10 percent potassium hydroxide in methanol. An additional 4 ml. of methanol is added and nitrogen is bubbled through the solution of 10 minutes. The reaction is stoppered and allowed to stand at room temperature overnight. Upon dilution with water and extraction with 2 portions of ethyl acetate and an additional water-wash, the reaction mixture is dried and concentrated.

There is obtained 92 mg. of 13-amino-18-norestradiol-3-methyl ether in the form of white crystals, melting point 140°-148°C.

EXAMPLE 9

Preparation of 3-Methoxy-13-amino-gona-2,5(10)-diene-17-ol

An amount of 200 mg. of 13-amino-18-norestradiol-3-methyl ether is dissolved in 5.40 ml. of dry tetrahydrofuran and added to 12.0 ml. of liquid ammonia which has previously been dried with a small piece of metallic sodium. To the mixture there is added 3.20 ml. of t-butyl alcohol and 285 mg. of metallic sodium. The reaction mixture becomes blue in color but turns clear after 10 minutes. The mixture is refluxed for 25 minutes, after which the reaction is quenched with water and extracted three times with ethyl acetate. The produce is then back-washed with water, dried, and concentrated. There is obtained 199 mg. of 3-methoxy-13-amino-2,5(10)-diene-17-ol in the form of yellow crystals.

Treatment of the product with oxalic acid affords 13-amino-18,19-bisnor-androst-5(10)-ene-3-one-17-ol.

EXAMPLE 10

Preparation of 13-amino-18,19-bisnortestosterone

An amount of 290 mg. of 3-methoxy-13-amino-2,5(10)-diene-17-ol, prepared in Example 9, is dissolved in 12.5 ml. of a solution made from 0.8 cc. of concentrated hydrochloric acid dissolved in 27.0 ml. of methanol. The mixture is stirred under nitrogen for 3 hours at room temperature. There is obtained 171 mg. of 13-amino-18,19-bisnortestosterone in the form of yellowish crystals, melting point 171°–173°C.

EXAMPLE 11

Preparation of 13-N,N-dimethylamino-18-norestradiol-3-methyl ether

An amount of 15 mg. of 13-amino-18-norestradiol-3-methyl ether in 0.88 ml. of methanol is added to a solution of 5.0 ml. acetonitrile and 55 mg. of potassium carbonate. To the solution also is added 0.72 ml. of methyl iodide. The reaction mixture is stirred and refluxed under nitrogen for 3 hours. There is obtained a yield of 55 mg. of yellowish crystals which, on further refluxing in a small amount of ethyl acetate and washing with ethyl ether, produce 16 mg. of 13-dimethylamino-18-norestradiol-3-methyl ether in the form of crystals, melting point 116°–124°C.

EXAMPLE 12

Preparation of 13-N,N-dimethylamino-18,19-bisnortestosterone

The procedure of Example 11 is repeated, substituting 13-amino-18,19-bisnortestosterone for 13-amino-18-norestradiol 13-methyl ether. The product obtained is 13-N,N-dimethylamino-18,19-bisnortestosterone.

Obviously, many modifications and variations of the present invention are possible in light of the above teachings. It is therefore to be understood that, within the scope of the appended claims, the invention may be practiced otherwise than as specifically described.

What is claimed is:

1. A compound having the formula

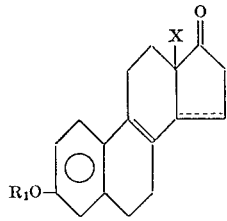

wherein $R_1$ represents a lower alkyl group; and X represents a lower alkanoylamino group, the dotted line at position-14 indicates the optional presence of a double bond.

2. A compound of claim 1 which is 8,14-bis-dehydro-13-acetylamino-18-norestrone-3-methyl ether.

3. A compound of claim 1 which is 8-dehydro-13-acetylamino-18-norestrone-3-methyl ether.

4. A compound having the formula

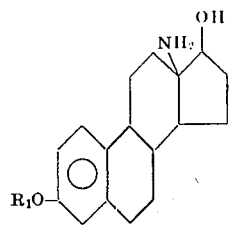

Wherein $R_1$ represents a lower alkyl group.

5. A compound of claim 4 which is 13-amino-18-norestradiol-3-methyl ether.

6. A compound having the formula

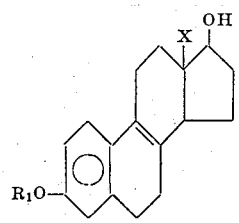

wherein $R_1$ represents a lower alkyl group, X represents a lower alkanoylamino group, and the dotted line at position 8 indicates the optional presence of a double bond.

7. A compound of claim 6 which is 8-dehydro-13-acetylamino-18-norestradiol-3-methyl ether.

8. A compound of claim 6 which is 13-acetylamino-18-norestradiol-3-methyl ether.

9. A compound having the formula

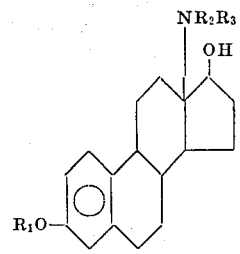

wherein $R_1$ is a lower alkyl group, $R_2$ is either hydrogen or a lower alkyl group, and $R_3$ is a lower alkyl group, provided that if $R_2$ is a lower alkyl group, $R_3$ is the same lower alkyl group.

10. The compound of claim 9 which is 18-N-methylamino-18-norestradiol-3-methyl ether.

11. The compound of claim 9 which is 13,N,N-dimethylamino-18-norestradiol-3-methyl ether.

12. A compound having the formula

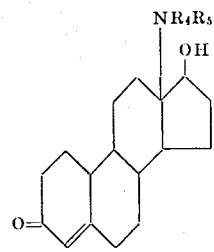

wherein $R_4$ is H or a lower alkyl group, and $R_5$ is H or a lower alkyl group, providing that if $R_4$ and $R_5$ are both lower alkyl, they are the same lower alkyl group.

13. A compound as defined in claim 12 wherein $R_4$ represents hydrogen and $R_5$ represents a lower alkyl group.

14. A compound as defined in claim 12 wherein $R_4$ and $R_5$ represent hydrogen.

15. The compound of claim 12 which is 13-amino-18,19-bisnortestosterone.

16. The compound of claim 12 which is 13-N,N-dimethylamino-18,19-bisnortestosterone.

17. The compound of claim 12 which is 13-N-methylamino-18,19-bisnortestosterone.

* * * * *